(12) United States Patent
Tsutsui (10) Patent No.: US 7,068,002 B2
(45) Date of Patent: Jun. 27, 2006

(54) MOTOR CONTROL DEVICE

(75) Inventor: Kazuhiko Tsutsui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/496,887

(22) PCT Filed: Apr. 5, 2002

(86) PCT No.: PCT/JP02/03435

§ 371 (c)(1),
(2), (4) Date: Mar. 3, 2005

(87) PCT Pub. No.: WO03/085816

PCT Pub. Date: Oct. 16, 2003

(65) Prior Publication Data

US 2005/0162111 A1    Jul. 28, 2005

(51) Int. Cl.
*G05B 13/04* (2006.01)
(52) U.S. Cl. ............... 318/560; 318/260; 318/561; 318/610; 700/37; 700/44; 700/69
(58) Field of Classification Search ............... None
See application file for complete search history.

(56) References Cited

U.S. PATENT DOCUMENTS

| | | | | | |
|---|---|---|---|---|---|
| 4,603,284 | A | * | 7/1986 | Perzley | 318/568.14 |
| 4,623,971 | A | * | 11/1986 | Ailman et al. | 700/252 |
| 4,714,988 | A | * | 12/1987 | Hiroi et al. | 700/45 |
| 4,829,219 | A | * | 5/1989 | Penkar | 318/568.18 |
| 4,988,935 | A | * | 1/1991 | York | 318/568.18 |
| 5,105,135 | A | * | 4/1992 | Nashiki et al. | 318/568.11 |
| 5,157,597 | A | * | 10/1992 | Iwashita | 700/37 |
| 5,159,254 | A | * | 10/1992 | Teshima | 318/611 |
| 5,221,884 | A | * | 6/1993 | Teshima | 318/569 |
| 5,223,778 | A | * | 6/1993 | Svarovsky et al. | 318/610 |
| 5,285,378 | A | * | 2/1994 | Matsumoto | 700/37 |
| 5,304,905 | A | * | 4/1994 | Iwasaki | 318/561 |
| 5,369,345 | A | * | 11/1994 | Phan et al. | 318/561 |
| 5,371,450 | A | * | 12/1994 | Hiraoka | 318/560 |
| 5,374,882 | A | * | 12/1994 | Matsubara et al. | 318/560 |
| 5,394,322 | A | * | 2/1995 | Hansen | 700/37 |
| 5,406,474 | A | * | 4/1995 | Hansen | 700/37 |

(Continued)

FOREIGN PATENT DOCUMENTS

JP     3-82385 A     4/1991

(Continued)

*Primary Examiner*—Rina Duda
*Assistant Examiner*—Robert W. Horn
(74) *Attorney, Agent, or Firm*—Sughrue Mion, PLLC (57) ABSTRACT

A motor control device comprises: a current limiter 115 for limiting a current-instruction signal Ir for a motor 18 and for turning a limiting signal L from off to on when the current-instruction signal Ir reaches a predetermined value; a model-position-generating part 220 having a model of an equivalent position-control system that includes characteristics of the motor control device 100 and a control target object, and calculating rotational position of the motor 18 as a model-position signal θm by inputting to the model a position-instruction signal θr; a correctional acceleration-generating part 240 for generating a correctional acceleration signal αse based on a correctional position deviation θse when the limiting signal L turns on; and a position-instruction-generating part 260 for generating the position-instruction signal θr based on an acceleration deviation αr that is equal to the difference between the original-acceleration-instruction signal Va and the correctional acceleration signal αse.

11 Claims, 8 Drawing Sheets

U.S. PATENT DOCUMENTS

| | | | | |
|---|---|---|---|---|
| 5,418,440 A * | 5/1995 | Sakaguchi et al. | | 318/560 |
| 5,475,291 A * | 12/1995 | Yoshida et al. | | 318/568.22 |
| 5,495,158 A * | 2/1996 | Schmidt et al. | | 318/561 |
| 5,587,896 A * | 12/1996 | Hansen et al. | | 700/28 |
| 5,684,374 A * | 11/1997 | Chaffee | | 318/616 |
| 5,684,375 A * | 11/1997 | Chaffee et al. | | 318/638 |
| 5,691,614 A * | 11/1997 | Takeishi | | 318/561 |
| 5,736,824 A * | 4/1998 | Sato et al. | | 318/561 |
| 5,742,138 A * | 4/1998 | Kato et al. | | 318/568.18 |
| 5,990,645 A * | 11/1999 | Nakamura et al. | | 318/432 |
| 5,994,864 A * | 11/1999 | Inoue et al. | | 318/568.2 |
| 6,064,920 A * | 5/2000 | Monleone | | 700/170 |
| 6,144,181 A * | 11/2000 | Rehm et al. | | 318/629 |
| 6,198,246 B1 * | 3/2001 | Yutkowitz | | 318/561 |
| 6,308,106 B1 * | 10/2001 | Ameri et al. | | 700/45 |
| 6,470,225 B1 * | 10/2002 | Yutkowitz | | 700/44 |
| 6,477,433 B1 * | 11/2002 | Bailey | | 700/69 |
| 6,515,442 B1 * | 2/2003 | Okubo et al. | | 318/560 |
| 6,583,593 B1 * | 6/2003 | Iijima et al. | | 318/254 |
| 6,625,502 B1 * | 9/2003 | Ito et al. | | 700/69 |
| 6,751,043 B1 * | 6/2004 | Magee et al. | | 360/77.02 |
| 6,828,749 B1 * | 12/2004 | Zhang et al. | | 318/611 |
| 6,876,168 B1 * | 4/2005 | Luo et al. | | 318/560 |
| 6,912,426 B1 * | 6/2005 | Kerner | | 700/8 |
| 6,919,701 B1 * | 7/2005 | Nagata et al. | | 318/568.12 |
| 6,936,990 B1 * | 8/2005 | Oyama et al. | | 318/632 |
| 6,937,430 B1 * | 8/2005 | Ge et al. | | 360/78.06 |
| 6,961,628 B1 * | 11/2005 | Yutkowitz | | 700/37 |

FOREIGN PATENT DOCUMENTS

| | | |
|---|---|---|
| JP | 8-147038 A | 6/1996 |
| JP | 9-117177 A | 5/1997 |
| JP | 10-23777 A | 1/1998 |
| JP | 10-262387 A | 9/1998 |

* cited by examiner

MOTOR CONTROL DEVICE

TECHNICAL FIELD

The present invention relates to motor control devices that are used for, e.g., main axle motors that drive machine tools.

BACKGROUND ART

Figure 8:
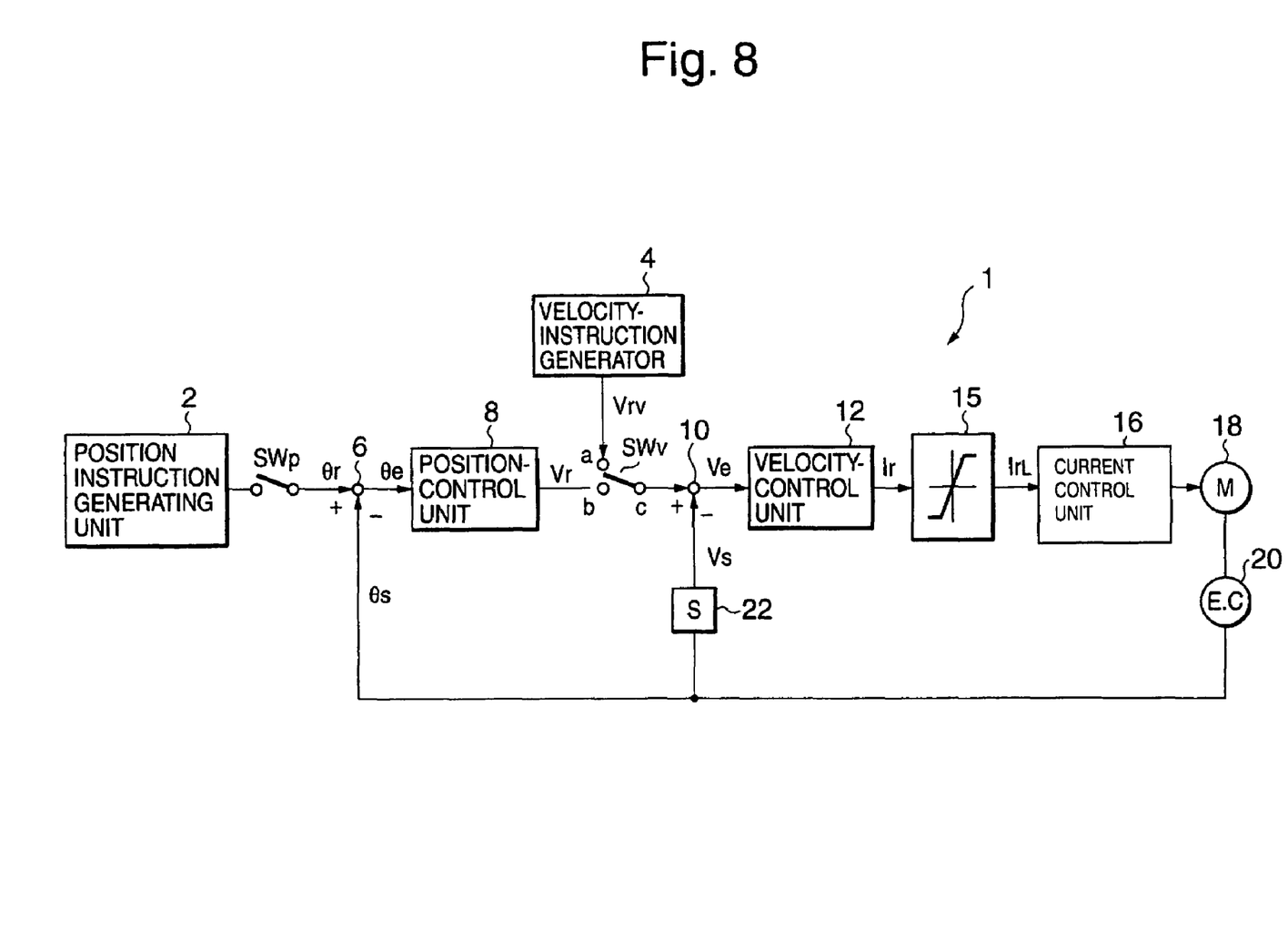
FIG. 8 is a block diagram illustrating a conventional motor control device.

A conventional motor control device is explained using FIG. 8. FIG. 8 is a block diagram of a motor control device having a means for switching from a velocity loop to a position loop.

In FIG. 8, a motor control device 1 comprises: an instruction-generating unit consisting of a position-instruction generator 2 and a velocity-instruction generator 4 for generating a position-instruction signal θr for a motor 18 and a velocity-instruction signal Vrv for the motor 18 respectively; a detection unit for detecting a position-detection signal θs and a velocity-detection signal Vs for the motor 18; a switch unit for switching control of the motor 18 from the velocity loop to the position loop; and a control unit for controlling the motor 18 based on e.g. position deviation θe that is equal to the difference between the position-instruction signal θr and the position-detection signal θs.

The detection unit comprises an encoder 20 for detecting the position-detection signal θs as the rotational position of the motor 18, and a velocity-detection unit 22 for generating the velocity-detection signal Vs from the position-detection signal θs having been inputted.

The switch unit switches between an output terminal "a" of the velocity-instruction generator 4 and an output terminal "b" of a position-control device 8, and comprises a switch SWv of which a terminal "c" is connected to a subtraction unit 10, and a switch SWp that is connected to an output of the position-instruction generator 2 and an input of a subtraction unit 6.

The control unit comprises: the subtraction unit 6 for calculating the position-deviation θe that is equal to the difference between the position-detection signal θs and the position-instruction signal θr; the position-control device 8 generating a velocity-instruction Vr based on the position-deviation θe having been inputted, and having a position-gain Kp; the subtraction unit 10 for calculating a velocity-deviation Ve that is equal to the difference between the velocity-instruction signal Vr (Vrv) and the velocity-detection signal Vs; a velocity-control unit 12 generating a current-instruction signal Ir based on the velocity-deviation Ve having been inputted; a current limiting unit 15 outputting a limited current-instruction signal IrL when the current-instruction signal Ir having been inputted exceeds a predetermined current value IrL; and a current control unit 16 supplying to the motor 18 a current based on the current-instruction signal IrL.

Here, the current-instruction signal Ir is limited by the current limiting unit 15 so that the motor 18 will have constant output-power characteristics. The reason for having constant output-power characteristics is that since the motor 18, which is used for example on the main axle of a numerical control machine tool, reaches tens of thousands of rpm, and the output power would be enormous if it has constant torque characteristics, and therefore it is made to have constant output-power characteristics after several thousand rpm.

The motor control device 1 constituted as explained above, in opening the switch SWp before the motor starts running and throwing on the switch SWv to the terminal "a" side, inputs into the subtraction unit 10 the velocity-instruction signal Vrv, which is issued from the velocity-instruction generator 4 based on a start-operation instruction, whereby the subtraction unit 10 calculates the velocity-deviation Ve that is equal to the difference between the velocity-instruction signal Vrv and the velocity-detection signal Vs, wherein the motor control device 1 controls the motor 18 velocity based on the velocity-deviation Ve.

Then, when the motor 18 transitions from constant speed to speed-reduction state, the switch SWp is closed from being open, reducing the speed of the motor 18 to a predetermined speed, and after the velocity-instruction signal Vrv from the velocity-instruction generator 4 has been confirmed consistent with the velocity-instruction signal Vr from position-control device 8 while the motor is running at a constant low speed, the switch SWv is thrown from the terminal "a" to the terminal "b," whereby the motor 18 is controlled according to the position loop based on the velocity-instruction signal Vr.

However, although control in the motor control device 1 is switched over from velocity loop to position loop as aforesaid, there have been problems in that control of e.g. timing when the switch SWv is thrown from the terminal "a" to the terminal "b" is complicated.

In order to solve such problems, although opening the switch SWp before the motor 18 starts running, and driving it only by the position-instruction signal θr from the position-instruction generator 2 by throwing the switch SWv to the terminal "b" is conceivable, there would be a problem that the acceleration of the motor 18 would overshoot, because the position-deviation θe would widen when the current limiter 15 functions and the motor 18 acceleration drops, and when the current limitation by the current limiter 15 is then released, the motor 18 would operate based on the large position-deviation θe.

DISCLOSURE OF INVENTION

The present invention is made in order to solve the above problems, and aims at providing a motor control device for controlling a motor using a position-loop, wherein position-deviation is not increased though current-instructions are controlled by a current-limiter.

A motor control device relating to the first aspect of the invention comprises: a position-detecting means for detecting, as a position-detection signal, rotational position of a motor driving a control target object; a control means for controlling the motor by means of a position loop, based on position-deviation equal to the difference between a position-instruction signal instructing the rotational position of the motor, and the position-detection signal; an acceleration-generating means for generating an original acceleration-instruction signal for accelerating or decelerating the motor; a current-limiting means for, when a current-instruction signal to the motor reaches a predetermined value, limiting the current-instruction signal and turning a limiting signal from off to on; a modeling means having a model of an equivalent position-control system including characteristics of the motor control device, the motor, and the control target object, for calculating rotational position of the motor as a model-position signal by inputting the position-instruction signal into the model; a correctional acceleration means for generating, when the limiting signal turns on, a first correctional acceleration signal based on a correctional position deviation equal to the difference between the model-position signal and the position-detection signal; and a position-instruction-generating means for generating the position-instruction signal based on an acceleration deviation equal to the difference between the original acceleration-instruction signal and the first correctional acceleration signal.

According to the motor control device in this case, when the limiting signal turns on, the modeling means calculates the rotational position of the motor as the model-position signal, the correctional acceleration means generates the first correctional acceleration signal based on the difference between the model-position signal and position-detection signal, and the position-instruction-generation means generates the position-instruction signal based on the acceleration-deviation, which is equal to the difference between the original acceleration-instruction signal and the first correctional acceleration signal.

Therefore, even though the current-limiting means turns on, the position-deviation, which is equal to the difference between the position-instruction signal and the position-detection signal, will not increase, because the original acceleration-instruction signal is lowered by the first correctional acceleration signal.

Accordingly, the invention has an effect of providing a motor control device that will not overshoot easily, even though the current-limiting means turns off from on.

A motor control device relating to a second aspect of the invention comprises an acceleration-decrease means for generating, instead of the first correctional acceleration signal, by the limiting signal turning from on to off a second correctional acceleration signal that is lower than the first correctional acceleration signal.

According to the motor control device in this case, a fluctuation in the acceleration-deviation is kept under control when the current-limiting means transitions from on to off, because the second correctional acceleration signal, which is lower than the first correctional acceleration signal, is generated. Therefore, the invention has an effect of controlling initial overshoot of the motor when the current-control means is released.

A motor control device relating to a third aspect of the invention comprises: a velocity-instruction-generating means for generating an original velocity-instruction signal for rotating the motor; a reference-velocity-instruction-generating means for generating a reference-velocity-instruction signal based on the acceleration deviation; a second subtraction means for calculating a reference-velocity deviation equal to the difference between the original velocity-instruction signal and the reference-velocity-instruction signal; and a conversion means for generating the second correctional acceleration signal based on the reference-velocity deviation.

According to the motor control device in this case, the invention has an effect that the acceleration-decreasing means is easily configured.

A motor control device relating to a fourth aspect of the invention comprises a first correction means for, when the motor is accelerating, zeroing the first correctional acceleration signal by satisfying the relation "first correctional acceleration signal αse<0," and for, when the motor is decelerating, zeroing the first correctional acceleration signal by satisfying the relation "first correctional acceleration signal αse>0."

According to the motor control device in this case, the motor continues acceleration in accelerating mode, and the motor continues deceleration in decelerating mode, because a predetermined limitation is set on the first correctional acceleration signal. Therefore, the invention has an effect of controlling a fluctuation of the motor.

A motor control device relating to a fifth aspect of the invention comprises a second correction means, when the motor is accelerating, wherein the first correctional acceleration signal is made lower than the original acceleration signal by letting the first correctional acceleration signal be αse and the original acceleration signal be αa and by satisfying the relation "αse≧αa," and when the motor is decelerating, the first correctional acceleration signal is made lower than the original acceleration signal by satisfying the relation "αse<αa."

According to the motor control device in this case, the acceleration-deviation does not become greater than the original acceleration signal, because an appropriate limitation is added to the first correctional acceleration signal as described in the above. Therefore, the invention has an effect of controlling acceleration and deceleration of the motor without fail.

A motor control device relating to a sixth aspect of the invention comprises: a velocity-instruction-generating means for generating an original velocity-instruction signal for rotating the motor; a correctional accumulation means for calculating, based on the first and second correctional acceleration signal, a cumulative position-correcting signal that is a cumulative value of a position-correction value and that drives the motor; and a cumulative instruction-generating means for generating the cumulative position-correcting signal by the original velocity-instruction signal turning off.

According to the motor control device in this case, the motor is driven based on the cumulative position-correction signal, which is accumulated based on the first and second correctional acceleration signal, by the original velocity-instruction signal turning off.

Therefore, the invention has an effect of controlling motor position based on the original acceleration-instruction signal as though the current-limiting means were off even when the current-limiting means is on.

A motor control device relating to a seventh aspect of the invention comprises: a velocity-instruction-generating means for generating an original velocity-instruction signal for rotating the motor; a stop-instruction-generating means for generating a stop-position-instruction signal that stops the motor at a predetermined stop-position when the original velocity-instruction signal turns off; a correctional position means for calculating a correctional position signal for the motor based on the first and second correctional acceleration signal; and an adding means for calculating a correctional position signal that is a sum of the stop-position-instruction signal and the correctional position signal and that drives and stops the motor at the predetermined position.

According to the motor control device in this case, the invention has an effect of stopping the motor at a required position as though the current-limiting means were off even when the current-limiting means is on, because the stop-control means drives and stops the motor based on the correctional stopping signal that is the sum of the stop-position-instruction signal and the correctional position signal.

For example, the stop-position signal of the stop-instruction-generating means may be a signal to stop the motor at a predetermined position within one rotation of the motor, and the correctional position means may calculate the correctional position signal within one rotation of the motor based on the correctional acceleration signal. According to the motor control device, the invention has an effect of stopping the motor at required position within one rotation.

Resultantly, by using the motor on, for example, a main axle of a numerical control device, tools can easily be attached to or detached from the device, even in cases where the tools are directly coupled with the motor axle and can not be attached or detached except for at a specified rotational position.

A motor control device relating to an eighth aspect of the invention comprises an alarm means for issuing an alarm when the correctional position deviation value reaches a predetermined value.

According to the motor control device in this case, the invention has an effect of enabling an irregular position-deviation that is equal to the difference between the model-position signal and the position-detecting signal to be quickly detected.

BEST MODE FOR CARRYING OUT THE INVENTION

Embodiment 1

Figure 1:
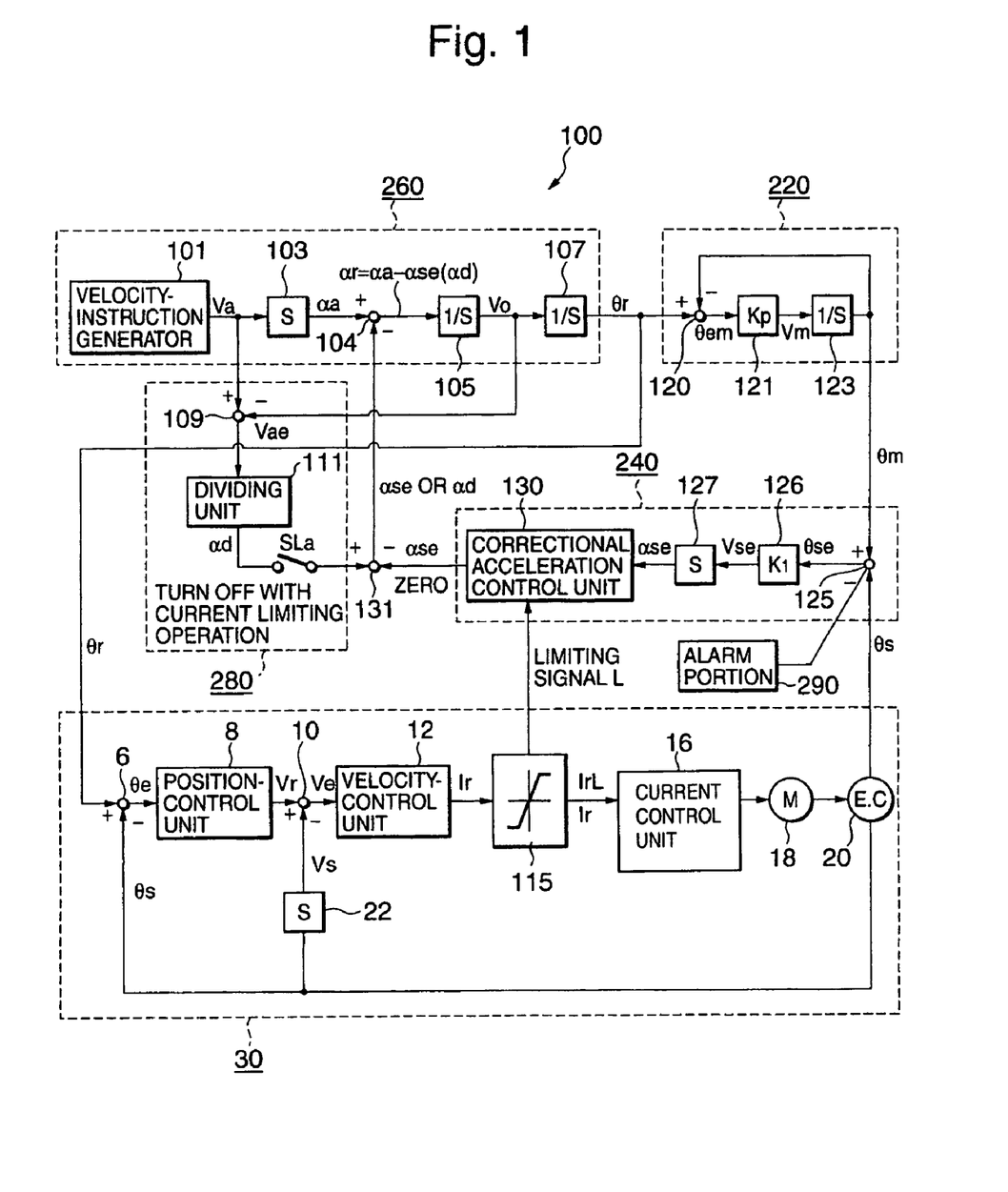
FIG. 1 is a block diagram illustrating a motor control device according to an embodiment of the invention.

One of embodiments of the invention is explained with reference to FIG. 1. FIG. 1 is a block diagram illustrating a motor control device according to the embodiment. In FIG. 1, reference numerals that are the same as those in FIG. 8 refer to identical or equivalent items; therefore, their explanations are omitted.

In FIG. 1, a motor control device 100 comprises a motor control part 30 for controlling a motor 18 by a position-instruction signal θr, a correctional position-instruction means for generating the appropriate position-instruction signal θr when current limitation is made operational by a current-instruction signal Ir exceeding a predetermined limit value of a current limiter 115; and an alarm part 290 as an alarm means for blinking a red light from a red light-emitting diode (not illustrated) or for stopping the motor 18 when the correctional position deviation θse described below has exceeded the predetermined value.

Further, the motor 18 is connected to a control target object (not illustrated).

A motor control part 30 comprises the current limiter 115 as a current-limiting means that is inputted with the current-instruction signal Ir and outputs a current-limiting signal IrL. In the case in which the current-instruction signal Ir, which is inputted from a velocity-control unit 12, is greater than the current-limiting signal IrL, the current limiter 115 outputs to a current control unit 16 the current-limiting signal IrL for limiting current, and turns on a limiting signal L (hereinafter referred to as "the current limiter 115 turns on"). In the case in which the current-instruction signal Ir is not greater than the current-limiting signal IrL, the motor control device outputs the current-instruction signal Ir to the current control unit 16, without changing the signal, and turns off the limiting signal L (hereinafter referred to as "the current limiter 115 turns off").

The correctional position-instruction means comprises: a model-position-generating part 220 as a modeling means for generating a model-position signal θm; a correctional acceleration-generating part (correctional acceleration means) 240 for generating a first correctional acceleration signal αse that is based on the correctional position deviation θse that is equal to the difference between the model-position signal θm and a position-detection signal θs, and that is generated in order to correct a original acceleration-instruction signal αa generated from an integrating unit 103; a position-instruction-generating part 260 for generating the position-instruction signal θr based on an acceleration-deviation αr that is calculated by subtracting the correctional acceleration signal αse or a low acceleration signal αd from the original acceleration-instruction signal αa; and a acceleration-control (acceleration-decrease means) part 280 for keeping the acceleration-deviation αr under control, so that acceleration-deviation does not abruptly change when the current-limiter 115 transits from on to off.

The model-position-generating part 220 has an equivalent position-control system model that includes characteristics of the control target object (not illustrated) driven by the motor control part 30 and the motor 18, and that calculates the rotating position (actual position) of the motor 18 as the model-position signal θm based on the position-instruction signal θr.

Although there are a number of examples of the above-described models, a simple example will be explained.

In the control system of the motor 18, that is, the motor control part 30 and the control target object (not illustrated) driven by motor 18, the response of the velocity-loop is sufficiently quicker than that of the position-loop. Therefore, it is assumed that the control system is a primary delay system wherein a real position θs is generated through the position-instruction signal θr, a position-gain Kp, and an integrating unit 1/s. Accordingly, the model-position-generating part 220 comprises: a subtraction unit 120 for calculating position-deviation θm that is equal to the difference between the position-instruction signal θr and the model-position signal θm, a gain unit 121 that generates a model-velocity signal Vm based on the inputted position-deviation θm and has a position-gain Kp; and an integrating unit 123 that generates the model-position signal θm based on the inputted model-velocity signal Vm.

Figure 3:
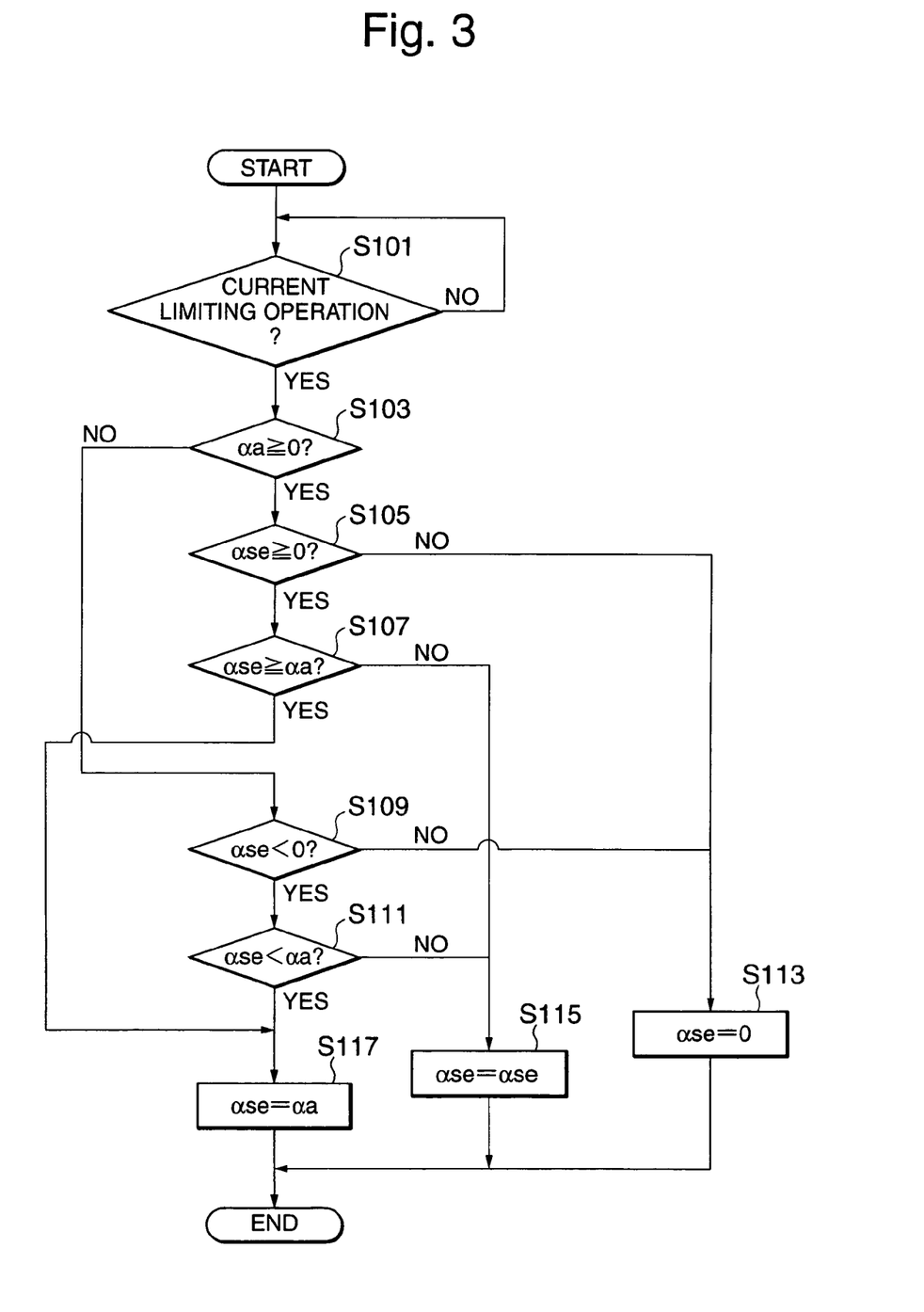
FIG. 3 is a flow chart illustrating operations of a correctional acceleration device illustrated in FIG. 1.

A correctional acceleration-generator part 240 comprises: a subtraction unit 125 for calculating the position-deviation θse that is equal to the difference between the model-position signal θm and the position-detection signal θs detected by the encoder 20 as a position-detecting means; a converter 126 that generates a correctional velocity-instruction signal Vse based on the inputted position-deviation θse and has a gain K1; a differentiating unit 127 that generates the correctional acceleration-signal αse based on the inputted correctional velocity-instruction signal Vse; and a correctional acceleration-control device 130 that operates as in the flow-chart of FIG. 3 and outputs a zero signal or the correctional acceleration-signal αse by the current-limiting unit 115 turning on.

Further, the correctional acceleration-control device 130 outputs the zero signal when the current-limiter 115 is off.

The position-instruction-generating part 260 comprises: a velocity-instruction generator 101 as a velocity-instruction-generating means generating an original velocity-instruction signal Va; a differentiator unit 103 into which the original velocity-instruction signal Va is inputted and that generates the original-acceleration-instruction signal αa; a subtraction unit 104 for calculating the acceleration-deviation αr that is equal to the difference between the original-acceleration-instruction signal αa and the correctional acceleration signal αse, an integrating unit (a reference velocity-instruction generating means) 105 generating a reference-velocity-instruction signal Vo based on the inputted acceleration-deviation αr; and an integrating unit 107 for generating the position-instruction signal θr based on the inputted reference-velocity-instruction signal Vo.

Further, a subtraction unit 6 (a first subtraction means) into which the position-instruction signal θr is inputted calculates a position-deviation θm that is equal to the difference between the position-instruction signal θr and the position-detection signal θs.

An acceleration control part 280 comprises: a subtraction unit 109 (a second subtraction means) calculating a reference velocity deviation Vae that is equal to the difference between the original velocity-instruction signal Va and the reference-velocity-instruction signal Vo; a dividing unit (converting means) 111 wherein the inputted reference velocity deviation Vae is converted into the acceleration signal and is divided by a predetermined value "d" so as to generate a low acceleration signal (a second correctional acceleration signal) αd that is lower than the first correctional acceleration signal αse; a switch SLa, one side of which is connected to the output terminal of the dividing unit 111, and the other side of which is connected to the subtraction unit 131, and that operates complementary to the on/off operations of the current limiter 115, wherein the dividing unit 111 generates the low acceleration signal αd by the switch SLa turning from off to on when the current limiter 115 turns from off to on, so that the acceleration-deviation αr is configured so as not to change abruptly after the current limiter 115 returns from on to off.

Further, a subtraction unit 131 selectively adds the low acceleration signal αd or the correctional acceleration signal αse to the subtraction unit 104 based on operations of the correctional acceleration-control device 130.

In general, the correctional acceleration-control unit 130 outputs the inputted correctional acceleration signal αse without changing/correcting the signal when the current limiter 115 is on, and outputs a zero signal when the current limiter is off. However, the correctional acceleration-control unit 130 outputs a correctional acceleration signal αse that is corrected by the first and second correction means as described below, because it is sometimes inappropriate to output the correctional acceleration signal αse without changing/correcting it.

If the correctional acceleration signal αse that is obtained during motor 18 acceleration (or deceleration) is not equal to or greater than zero (or less than zero), the correctional acceleration αse is added to the original acceleration-instruction signal αa; accordingly, the acceleration deviation αr is greater than the original acceleration-instruction signal αa, which is not preferable; therefore, as a first correction means, the correctional acceleration signal αse is set to zero so that the acceleration-deviation αr, which is an acceleration-instruction (or deceleration-instruction) of the motor 18, doesn't become higher than the original acceleration-instruction signal αa.

If the correctional acceleration signal αse that is obtained during motor 18 acceleration (or deceleration) is equal to or greater than αa (or less than αa), the acceleration-deviation αr, which is the acceleration-instruction (or deceleration-instruction) of the motor 18, becomes minus (or plus), i.e. the deceleration-instruction (acceleration-instruction); therefore, as a second correction means, the acceleration-deviation αr, which is the acceleration-instruction (or deceleration-instruction) of the motor 18, is set to zero as a minimum value αmin, with the correctional acceleration signal αse being made identical to the original acceleration-instruction signal αa and outputted.

Therefore, the acceleration-instruction (or deceleration-instruction) of the motor 18 is accelerated based on an allowable acceleration range αx between the original acceleration-instruction signal αa and zero signal.

The operations of the motor Control device configured as described above will be explained with reference to FIG. 1 through FIG. 3. At time t0, the original velocity-instruction signal Va is generated from the velocity-instruction generator 101, and the signal Va produces the original acceleration-instruction signal αa via the differentiating unit 103. Then, output of the correctional acceleration-limiter 130 is zero, because the current limiter 115 is off.

Meanwhile, the reference-velocity deviation Vae, which is an output of the subtracting unit 109, is zero in the acceleration control part 280, because the reference-velocity signal Va is the same as the original velocity-instruction signal Va when the current limiter 115 is off and the switch SLa is on. Accordingly the dividing unit 111 generates a zero signal. Therefore, the subtraction unit 131 inputs a zero signal into the subtraction unit 104, because the output of the correctional acceleration-limiter 130 is zero and the low velocity signal αd is zero. The subtraction unit 104 inputs into the integrating unit 105 the original acceleration-instruction signal αa without changing the signal, as the acceleration deviation αr, and generates the position-instruction signal θr through the integrating unit 105 and 107.

The model-position-generating part 220 generates the model-position signal θm based on the position-instruction signal θr through a gain unit 121 and an integrating unit 123, and then a subtraction unit 125 calculates the correctional position-deviation θse, which is equal to the difference between the model-position signal θm and the position-detection signal θs, and inputs correctional acceleration-signal αse to the correctional acceleration-limiter 130 via a converter unit 126 and a differentiating unit 127.

The subtraction unit 6 calculates the position-deviation θe that is equal to the difference between the position-instruction signal θr and the position-detection signal θs, and the position control unit 8 generates a velocity-instruction signal Vr based on the position-deviation θe. The subtraction unit 10 inputs into the velocity-control unit 12 the velocity-deviation Ve, which is equal to the difference between the velocity-instruction signal Vr and the velocity-detection signal Vs. The velocity-control unit 12 generates the current-instruction signal Ir based on the velocity-deviation Ve. The current limiter 115 inputs into the current-control unit 16 the current-instruction signal Ir as the current-limiting signal IrL, because the current limiter 115 is off. The current-control unit 16 supplies the required current into the motor 18 and drives it based on the current-instruction signal IrL.

Here, a position loop of the motor control device is a closed loop wherein the position-instruction signal θr is inputted into the subtraction unit 6, the subtraction unit 6 calculates the position-deviation θe, and the position-instruction signal θr is transferred to the position control unit 8, the subtraction unit 10, the velocity-control unit 12, the current limiter 115, the current limiter 16, the motor 18, the encoder 20, and to the subtraction unit 6 based on the position-deviation θe so that the motor 18 is controlled by the position loop.

If the torque and rpm of the motor 18 increase, whereby the current limiter 115 turns on at time t1, the limiting signal turns on and the switch SLa turns off, and the limiting signal L is inputted into the correctional acceleration-limiter 130. The correctional acceleration-limiter 130 judges whether the current limiter 115 is on or off based on whether the limiting signal L is on or off (step 101), and, because the limiting signal L is on, judges whether the original acceleration-instruction signal αa is equal to or greater than zero (step 103), and, because the motor is accelerating, the original acceleration-instruction signal αa is equal to or greater than zero.

Next, the correctional acceleration-limiter 130 judges whether the correctional acceleration signal αse is equal to or greater than zero (step 105). If the correctional acceleration signal αse is equal to or greater than zero, it judges whether the correctional acceleration signal αse is equal to or greater than αa (step 107). If the correctional acceleration signal αse is less than αa, the correctional acceleration signal αse is inputted into the subtraction unit 131 (step 115). The subtraction unit 131 inputs into the subtraction unit 104 the correctional acceleration signal αse because the switch SLa remains off.

The subtraction unit 104 calculates the acceleration-deviation αr that is equal to the difference between the original acceleration-instruction-signal αa and the correctional acceleration signal αse, and inputs into the integrating unit 105 the acceleration-deviation αr; the integrating unit 107 generates the position-instruction signal θr, and then the motor 18 is driven as explained above.

Meanwhile, if the signal αse is equal to or greater than the signal αa at step 107, as described above, in order to make the original acceleration-instruction signal of the motor 18 αmin (zero) by second correction means, the correctional acceleration-limiter 130 makes the correctional acceleration signal αse equal to the original acceleration-instruction signal αa and outputs the signal αse (step 117). Further, if the signal αse is less than zero at the step 105, the correctional acceleration signal αse is outputted as zero (step 113), in order to control the acceleration-instruction signal under the original acceleration-instruction signal αa by the first correction means described above.

Figure 2:
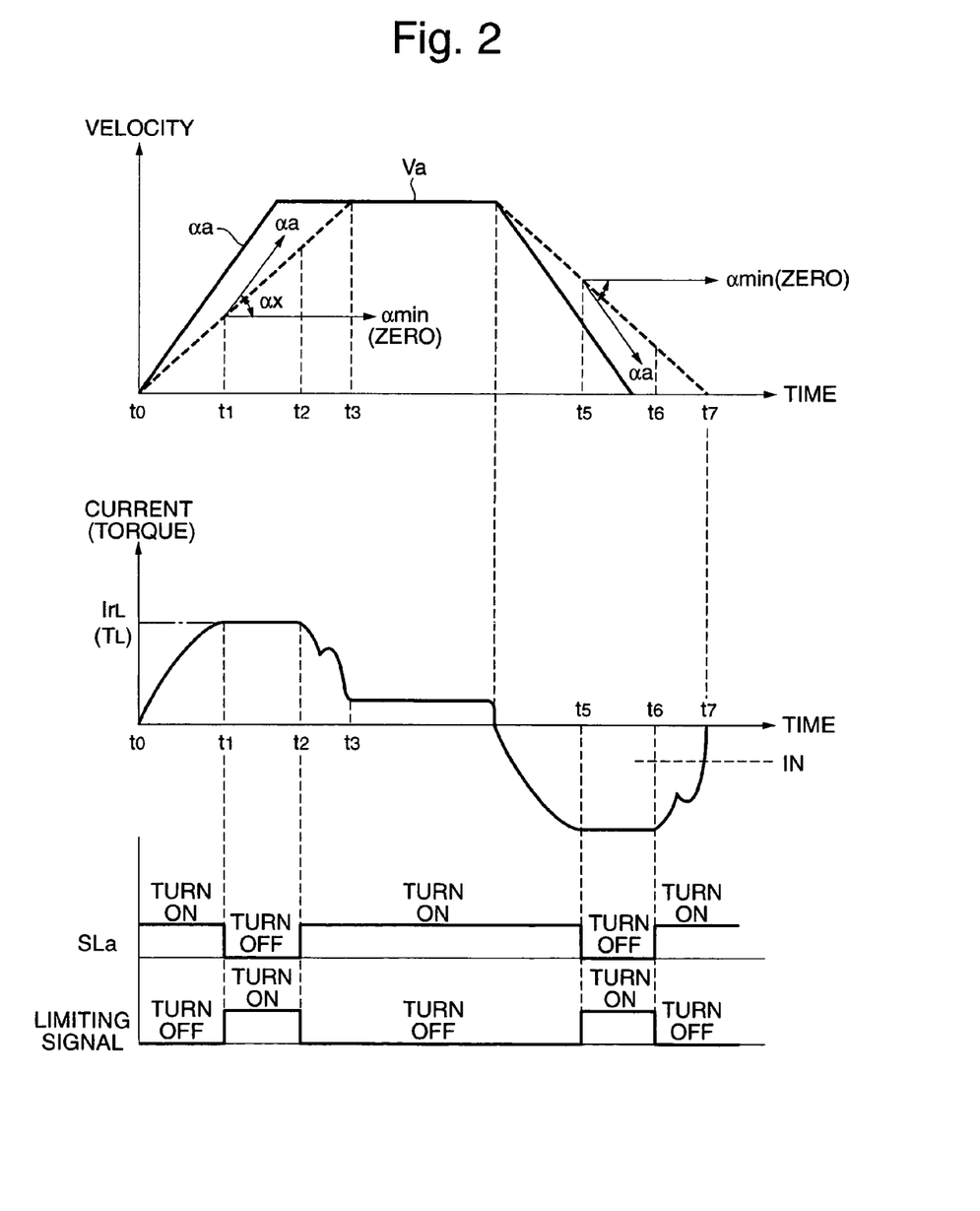
FIG. 2 is a velocity-vs.-time graph chart of a motor driven by the motor control device illustrated in FIG. 1.

At time t2, a required torque of the motor 18 decreases and the current Ir also decreases. Accordingly, the current limiter 115 turns from on to off, whereby the limiting signal L turns off, and output of the correctional acceleration-limiter 130 becomes zero, and the switch SLa turns on. When the switch SLa turns on, the subtraction unit 109 calculates the reference-velocity deviation Vae and inputs into the divider unit 111 the reference-velocity deviation Vae. The dividing unit 111 divides the reference-velocity deviation Vae by a constant value "d", and generates a low acceleration signal αd, and inputs it into the subtraction unit 104 the low acceleration signal αd. The subtraction unit 104 calculates the acceleration-deviation αr and inputs it into the integrating unit 105, and the integrating unit 107 generates the position-instruction signal θr. Therefore, an abrupt change of the position-instruction signal θr can be controlled by decreasing the acceleration-deviation αr when the current limiter 115 transits from on to off.

At time t3, the acceleration of the motor 18 has been completed. Next, the motor 18 rotates at a constant velocity and transits from acceleration to deceleration mode. At time t5, if the torque of the motor 18 increases and the current limiter 115 turns on again, the limiting signal L turns on, the switch SLa turns off, and the limiting signal L is inputted into the correctional acceleration control unit 130.

The correctional acceleration control unit 130 performs the above step S101, and judges whether the original acceleration-instruction signal αa is equal to or greater than zero (step S103) because the limiting signal L is on. Because the motor 18 is in deceleration mode and the original acceleration-instruction signal αa is not greater than zero, it judges whether the correctional acceleration signal αse is smaller than zero (step S109); if the correctional acceleration signal αse is not smaller than zero, the correctional acceleration control unit makes the correctional acceleration signal αse zero by the first correction means in order to control the acceleration-instruction signal of the motor 18 to stay under the original acceleration-instruction signal αa (step S113).

If the correctional acceleration signal αse is smaller than zero at step S109, the correctional acceleration control unit 130 judges whether the signal αse is smaller than the signal αa, and if the signal αse is not smaller than the signal αa, it generates the correctional acceleration signal αse (step S115), and controls the motor 18 by generating the position-instruction signal θr as described above. Meanwhile, if the signal αse is greater than the signal αa at step S111, the correctional acceleration control unit 130 generates the correctional acceleration signal αse as the original acceleration-instruction signal αa so as to make the acceleration signal of the motor 108 zero (step S117).

At time t6, if the required torque of the motor 18 decreases and the current instruction signal Ir decreases, the motor control device 100 will operate in the same way as it operates at time t2, the original acceleration-instruction signal αa will become zero at time t7, and the operation of the motor 18 will be finished.

The model-position-generating part 220 generates the model-position signal θm as described above, the correctional acceleration-generating part 240 generates the correctional acceleration signal αse under predetermined conditions based on the correctional position deviation θse that is equal to the difference between the model-position signal θm and the position-detection signal θs with the limiting signal L of the current limiter 115 turning on, and the subtraction unit 104 generates the position-instruction signal θr based on the acceleration-deviation αr that is calculated by subtracting the correctional acceleration signal αse from the original acceleration-instruction signal αa. Therefore, if the current limiter 115 turns on, the position deviation θe, which is equal to the difference between the position-detection signal θs and the position-instruction signal θr, is difficult to increase by the appropriate position-instruction signal θr being inputted into the motor control part 30. Thus, a motor control device 100 that prevents overshoot can easily be obtained.

Embodiment 2

Figure 4:
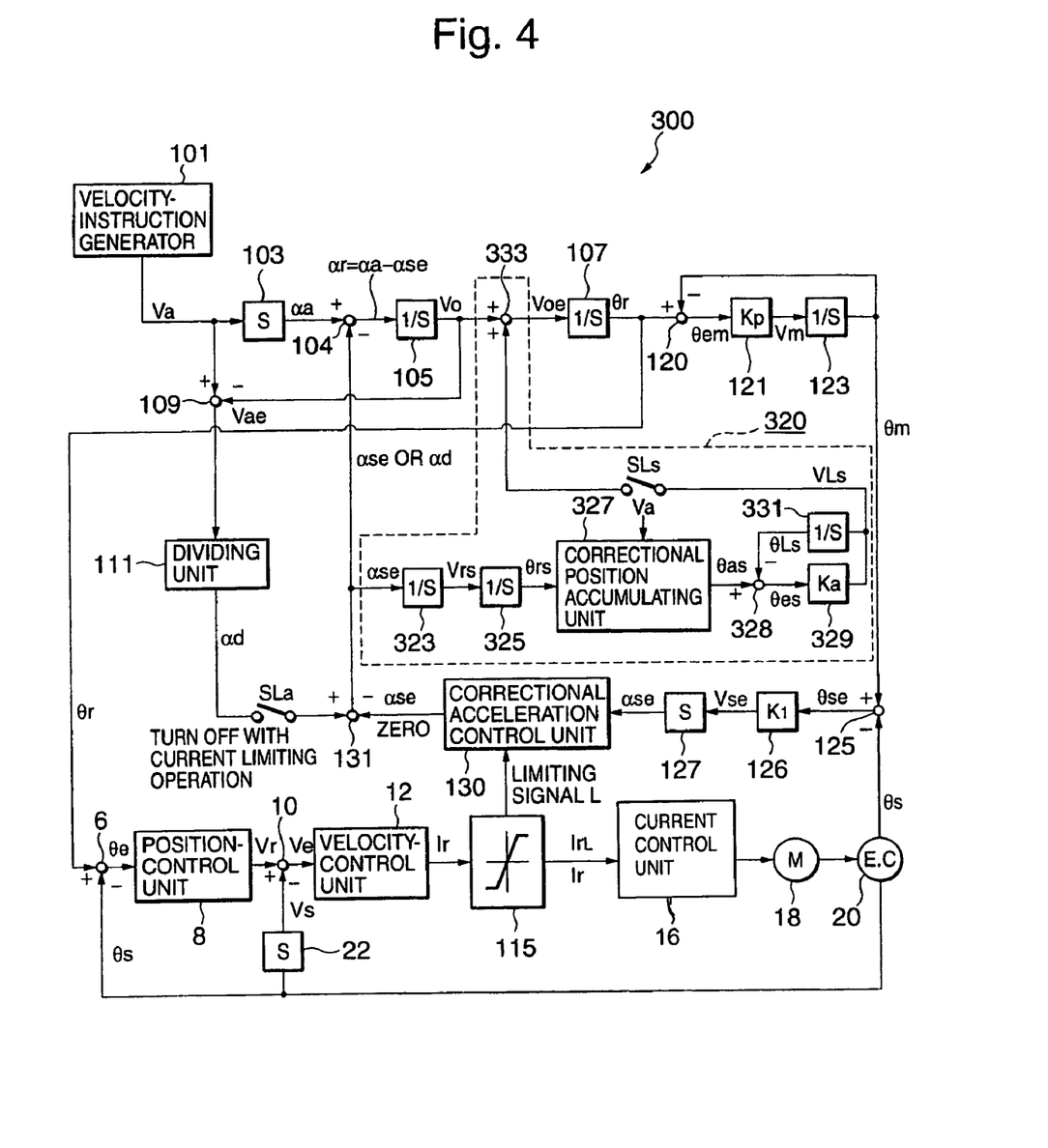
FIG. 4 is a block diagram illustrating a motor control device according to another embodiment of the invention.

Another embodiment of the invention is explained with reference to FIG. 4. FIG. 4 is a block diagram illustrating a motor control device according to another embodiment; and in FIG. 4, reference numerals that are the same as those in FIG. 1 refer to identical or equivalent items; therefore, their explanations are omitted.

In Embodiment 1, the current limiter 115 controls the motor 18 based on the acceleration-instruction (the acceleration-deviation αr) that is calculated by subtracting the correctional acceleration signal αse or the low acceleration signal αd from the original acceleration-instruction signal αa based on the on/off action of the current limiter 115.

However, the integral of the original velocity-instruction signals Va from the velocity-instruction generator 101, equal to an original position-instruction signal θa (not illustrated), differed from the position-instruction signal θr. Therefore, a motor control device 300 that stops the motor 18 at the position coincident with the original position-instruction signal θa is provided.

In FIG. 4, the motor control device 300 includes, in addition to the configuration of Embodiment 1, a correctional position-instruction part 320 that makes an accumulated correctional position signal θas based on the correctional acceleration signal αse or the low acceleration signal αd, which both correct the original acceleration-instruction signal αa, and generates an accumulated velocity signal VLs that is based on the accumulated correctional position signal θas.

The correctional position-instruction part 320 comprises: an integrating unit 323 that outputs the inputted correctional acceleration signal αse and the low acceleration signal αd as a correctional velocity signal Vrs; an integrating unit 325 that outputs the inputted correctional velocity signal Vrs as a correctional position signal θrs; a correctional position-integrating unit 327 that calculates the cumulative correctional position signal θas by accumulating the inputted the correctional position signal θrs and that outputs the cumulative correctional position signal θas by the original velocity-instruction signal Va being zeroed; a subtraction unit 328 that calculates a position deviation θes that is equal to the difference between a return-position signal θLS, which is obtained through a gain unit 329 with a gain Ka, and an integrating unit 331, and the cumulative correctional position signal θas; an adding unit 333 that calculates a velocity deviation Voe that is the sum of an cumulative velocity signal VLs that is the output of the gain unit 329 and a reference-velocity-instruction signal Vo; and a switch SLs that turns from off to on by the original velocity-instruction signal Va being made zero.

Further, the correctional position-integrating unit 327 is equivalent to a correctional accumulation means and a cumulative instruction-generation means.

The operation of the motor control device configured above is explained using FIG. 4. At this point, if the current limiter 115 turns on at the time the motor 18 accelerates as described in Embodiment 1, the correctional acceleration signal αse is generated, the integrating unit 323 generates the velocity signal Vrs and inputs it into the integrating unit 325, and the integrating unit 325 generates the correctional position signal θrs.

Similarly, if the current limiter 115 turns from on to off as described in Embodiment 1, the limiting signal L turns off and the switch SLa turns on. If the switch SLa turns on, the subtraction unit 109 calculates the reference-velocity deviation Vae, and inputs the reference-velocity deviation Vae into the dividing unit 111. The dividing unit 111 divides the reference-velocity deviation Vae by constant value "d", and inputs into the integrating unit 323 the low acceleration signal αd, via the switch SLa and the subtraction unit 131. The integrating unit 323 generates the velocity signal Vrs and inputs it into an integrating unit 325, and the integrating unit 325 generates the correctional position signal θrs.

The correctional position-integrating unit 327 calculates and maintains the cumulative correctional position signal θas that accumulates rotational position signals of the motor 18 based on the correctional acceleration signal αse and the low acceleration signal αd until the velocity-instruction generator 101 stops generating the original velocity-instruction signal Va. Then, when the motor 18 accelerates, rotates at a constant speed, decelerates, and the original velocity-instruction signal Va turns zero, the correctional position-integrating unit 327 outputs to the subtraction unit 328 the cumulative correctional position signal θas.

The subtraction unit 328 calculates a correctional position deviation θes that is equal to the difference between the return-position signal θLS obtained through the gain unit 329 and through the integrating unit 331, and the cumulative correctional position signal θas; the gain unit 329 generates the accumulated-velocity signal VLs. Here, the output of the correctional acceleration-control unit 130 is zero, because the current limiter 115 is off.

The adding unit 333 inputs into the integrating unit 107 the accumulated-velocity signal VLs as the reference-velocity deviation Voe, because the original velocity-instruction signal Va, the correctional acceleration signal αse, and the low acceleration signal αd are zero. The integrating unit 107 inputs into the subtraction unit 6 the position-instruction signal θr based on the accumulated-velocity signal VLs.

As described in Embodiment 1, the subtraction unit 6 calculates the position deviation θe, and based on the position deviation θe makes a required current flow into the motor 18 and drives it.

Because the original velocity-instruction signal Va from the velocity-instruction generator 101 is not generated, the cumulative correctional position signal θas is calculated based on the correctional acceleration signal αse and on the low acceleration signal αd, and the motor 18 is driven and controlled based on the accumulated-velocity signal VLs that is based on the cumulative correctional position signal θas. Therefore, the motor control device 300 that stops the motor 18 at the position coincident with the original position-instruction signal θa can be provided.

Embodiment 3

Figure 5:
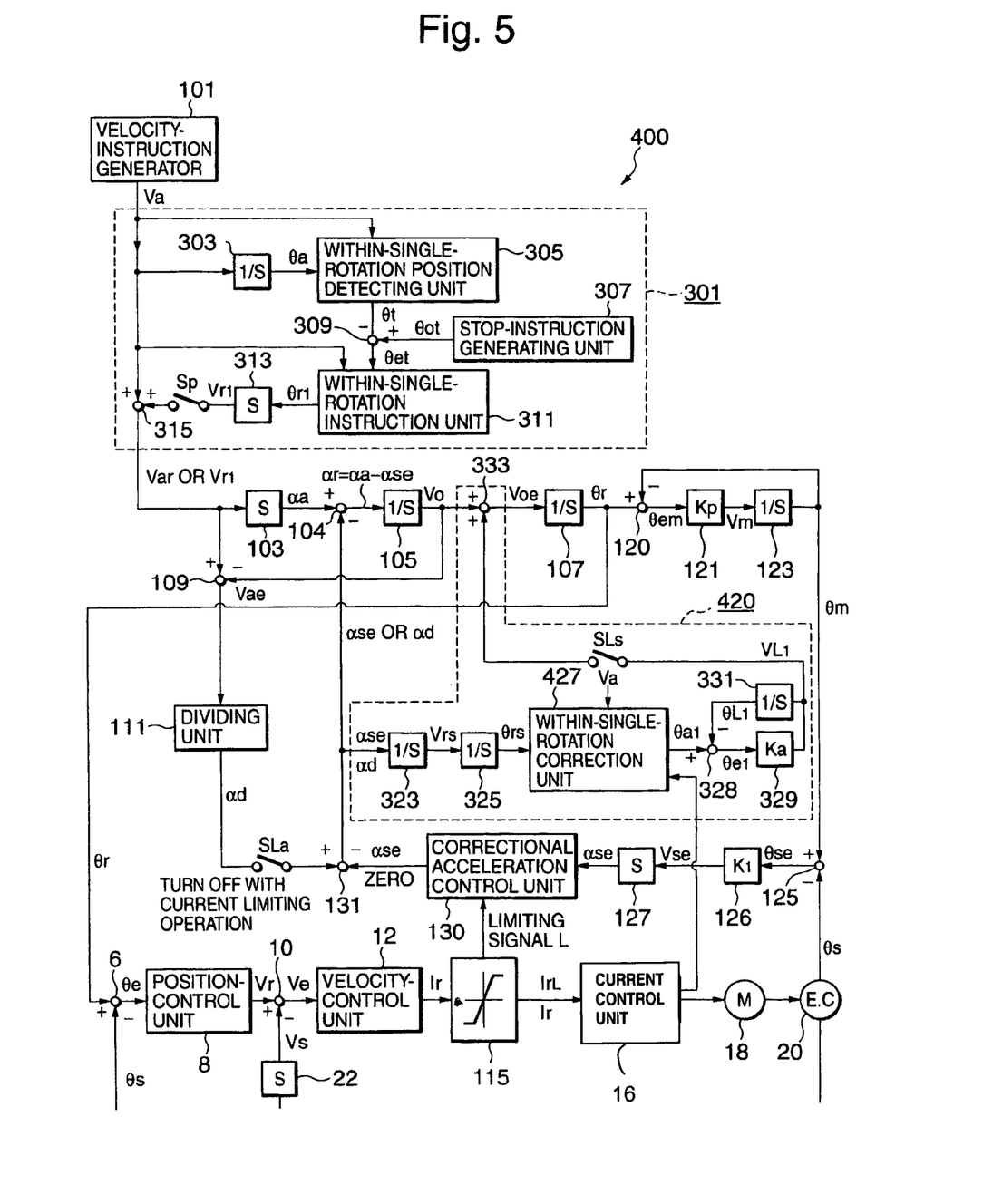
FIG. 5 is a block diagram illustrating a motor control device according to another embodiment of the invention.

Another embodiment of the invention is explained with reference to FIG. 5. FIG. 5 is a block diagram illustrating a motor control device according to another embodiment; and in FIG. 5, reference numerals that are the same as those in FIG. 4 refer to identical or equivalent items; therefore, their explanations are omitted.

In Embodiment 2, the motor control device 300 that stops the motor 18 at the position coincident with the original position-instruction signal θa based on the original speed-instruction signal Va has been provided.

A motor control device in this embodiment, which has been further developed from Embodiment 2 and is illustrated in FIG. 5, drives the motor 18 based on the original velocity-instruction signal Va from the velocity-instruction generator 101, as in Embodiment 1, after the motor 18 has returned to the original position, and the motor control device further comprises: a position-decision-instruction generator 301 that, when the original velocity-instruction signal Va becomes zero (is off), that is, when the motor is about to stop, calculates a stop-position-instruction signal θr1 for stopping the motor 18 at a required position within single rotation based on the original velocity-instruction signal Va, and generates the velocity-instruction signal Vr1 by conversion from the stop-position-instruction signal θr1; and a correctional position-instruction generator 420, which calculates a correctional position-instruction signal θa1 based on the correctional acceleration signal αse and the low acceleration signal αd, and translates the correctional position-instruction signal θa1 into a velocity-instruction signal Vr1 and outputs it; wherein the motor control device stops the motor 18 exactly at position of the stop-position-instruction signal θr1 by equivalent addition of the correctional position-instruction signal θa1 to the stop-position-instruction signal θr1.

The position-decision-instruction generator 301 comprises: an integrating unit 303 for integrating the original velocity-instruction signal Va and generating the original position-instruction signal θa; a within-single-rotation position-detecting unit 305 for calculating a stop-position within single rotation of the motor 18 when the original velocity-instruction signal Va becomes zero, and for generating a stop-position signal θt; a stop-instruction generator 307 for generating an original-stop-instruction signal θo1 for stopping the motor 18 at a required position within single rotation; a subtraction unit 309 for calculating a stop-position-deviation θet that is equal to the difference between the original-stop-instruction signal θo1 and the stop-position signal θt; a within-single-rotation instruction unit 311 for generating a predetermined stop-position signal θr1 based on the stop-position-deviation θet, as a stop-instruction generating means having RAM (not described in FIG.) as a storage; a differentiating unit 313 for differentiating the predetermined stop-position signal θr1 and for generating the stop-velocity-instruction signal Vr1; and a switch Sp that turns on when the original velocity-instruction signal Va is zero, and turns off when the original velocity-instruction signal Va is not zero.

Here, the predetermined stop-position signal θr1 is generated in accordance with the original velocity-instruction signal Va being zero, so that the motor 18 immediately generates the predetermined stop-position signal θr1 just before the motor 18 stops.

The correctional position-instruction generator 420 comprises: the integrating unit 323 for outputting the inputted acceleration signal αse and the low acceleration signal αd as the correctional velocity signal Vrs; the integrating unit 325 for outputting the inputted correctional velocity signal Vrs as the correctional position signal θrs; a within-single-rotation correction unit 427 for calculating a micro-correctional position signal θa1 within single rotation of the motor 18 based on the inputted correctional position signal θrs, and for outputting the micro-correctional position signal θa1 as correctional position means; the subtraction unit 328 for calculating a micro-correctional position deviation θe1 that is equal to the difference between the micro-correctional position signal θa1, and a return micro-correctional position signal θL1 that is obtained through the gain unit 329 having the gain Ka and through the integrating unit 331; and a subtraction unit 333 for calculating the correctional velocity deviation Voe that is equal to the difference between a micro-correctional velocity signal VL1 as the output of the gain unit 329 and the velocity-reference signal Vo.

The operation of the motor control device configured above is explained using FIG. 2 and FIGS. 5 to 7. At the time the motor control device 400 is driven, after an action in which the original position of the motor 18 is returned, the motor 18 is driven and controlled by generating the original velocity-instruction signal Va from the velocity-instruction generator 101, as described in Embodiment 1.

Figure 6:
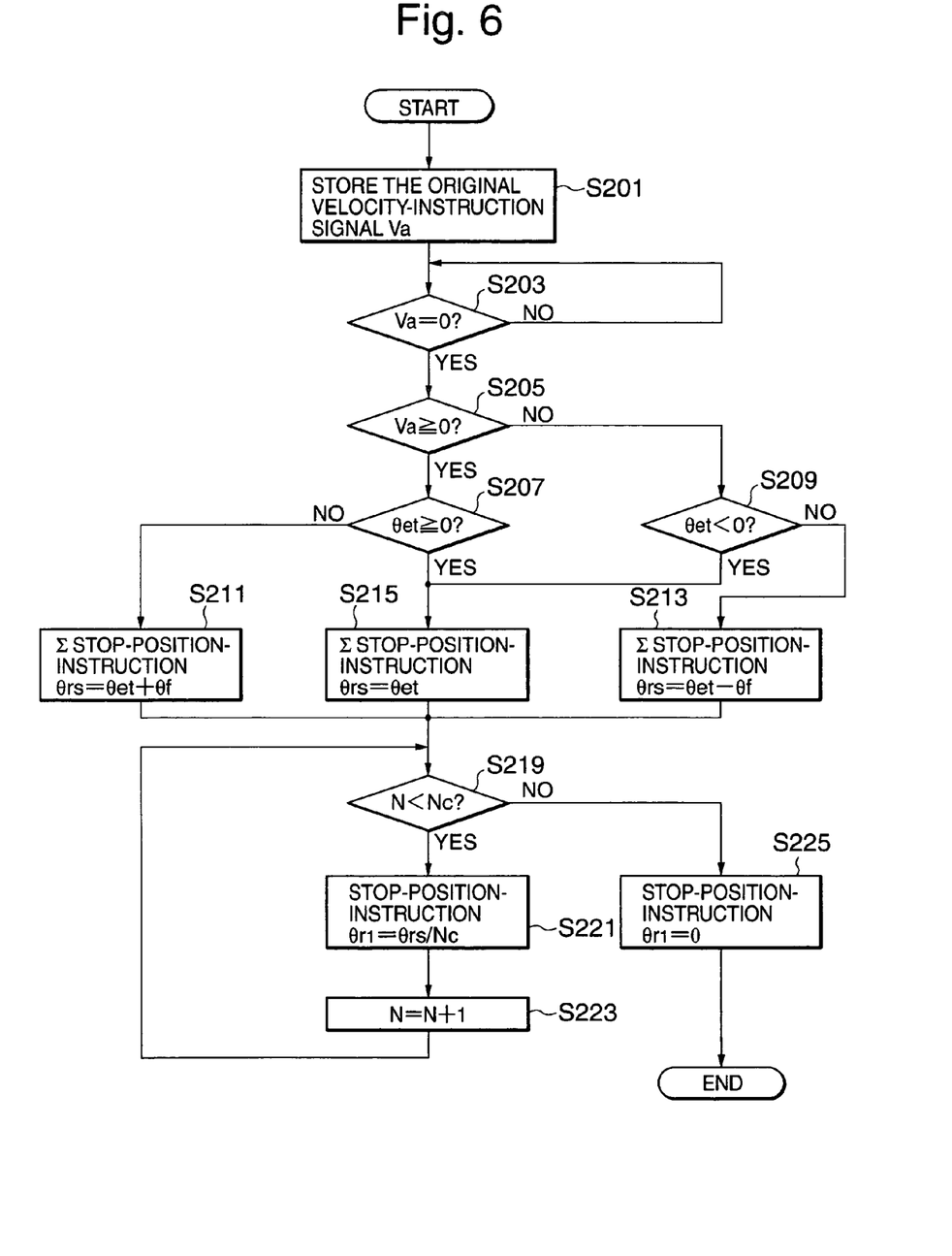
FIG. 6 is a flow chart illustrating operations of an instruction unit within one rotation illustrated in the FIG. 5.

The within-single-rotation instruction unit 311 stores the original velocity-instruction signal Va in the RAM (step S201), and judges whether the original velocity-instruction signal Va is zero (step S203). The judgment is performed because the stop-position-instruction signal θr1 is generated immediately when the original velocity-instruction signal Va becomes zero. When the original velocity-instruction signal Va becomes zero, the switch Sp turns from off to on, and just before the original velocity-instruction signal Va becomes zero, the original velocity-instruction signal Va is read out from the RAM, and it is judged whether the motor is rotating in the forward direction according to whether the original velocity-instruction signal Va is greater than zero (step S205). If the original velocity-instruction signal Va is equal to or greater than zero, that is, if the motor 18 is rotating in forward direction, it is judged whether the stop-position-deviation is equal to or greater than zero (step S207).

The within-single-rotation instruction unit 311 generates the stop-position-deviation θet as the summation of the correctional position signals θrs if the signal θet is equal to or greater than zero (step S215), and judges whether an occurrence N of each correctional position signal θr1 is lower than a predetermined specific occurrence Nc (step S219). If it is lower than the predetermined specific occurrence Nc, the within-single-rotation instruction unit generates the correctional position signal θr1 as the summation of the correctional position signals θrs/Nc and inputs it into the integrating unit 313 (step S221). The within-single-rotation instruction unit makes this judgment because the motor 18 is accelerated smoothly based on a stop-position-instruction signal θr1 that is smaller than the summation of the correctional position signals θrs. The integrating unit 313 generates the stop-velocity-instruction signal Vr1 and inputs it into the integrating unit 103 through the adding unit 315.

The within-single-rotation instruction unit 311 adds one count to the occurrence N (step S223), repeats step S219, S221, and S223, and if the occurrence N is over the predetermined occurrence Nc, finishes its operation with each correctional position signal θr1 being zero (step S225).

If the stop-position-deviation θet is not equal to or greater than zero at step S207, the summation of the stop-position-instruction signals θrs, which are the sum of a predetermined single-rotation-reference-position signal θf for rotating the motor 18 by single rotation, and the stop-position-deviation θet, is calculated (step S211). Here, the single-rotation-reference-position signal θf is added so that the rotating direction of the motor 18 is not reversed.

Further, if the original velocity-instruction signal Va is not equal to or greater than zero at step S205, that is, if the motor 18 is rotating in the reverse direction, a judgment as to whether the stop-position-deviation θet is, smaller than zero is made (step S209). If the deviation θet is smaller than zero, the stop-position-deviation θet is recognized as the summation of the stop-position-instruction signals θrs (step S215), and above steps S219 to S225 are executed.

If the stop-position-deviation θet is not smaller than zero at step S209, the summation of the stop-position-instruction signals θrs, in which the single-rotation-reference-position signal θf is subtracted from the position-deviation θet, is calculated (step S213). Here, the single-rotation-reference-position signal θf is subtracted from the position-deviation θet so as not to let the rotating direction of the motor 18 reverse.

Meanwhile, the correctional acceleration signal αse that has been generated in the acceleration/deceleration of the motor 18 in Embodiment 1, and the low acceleration signal αd are inputted into the integrating unit 323. The integrating unit 323 then generates the correctional velocity signal Vrs and inputs it into the integrating unit 325. The integrating unit 325 generates the correctional position signal θrs and inputs it into the within-single-rotation correction unit 427.

Figure 7:
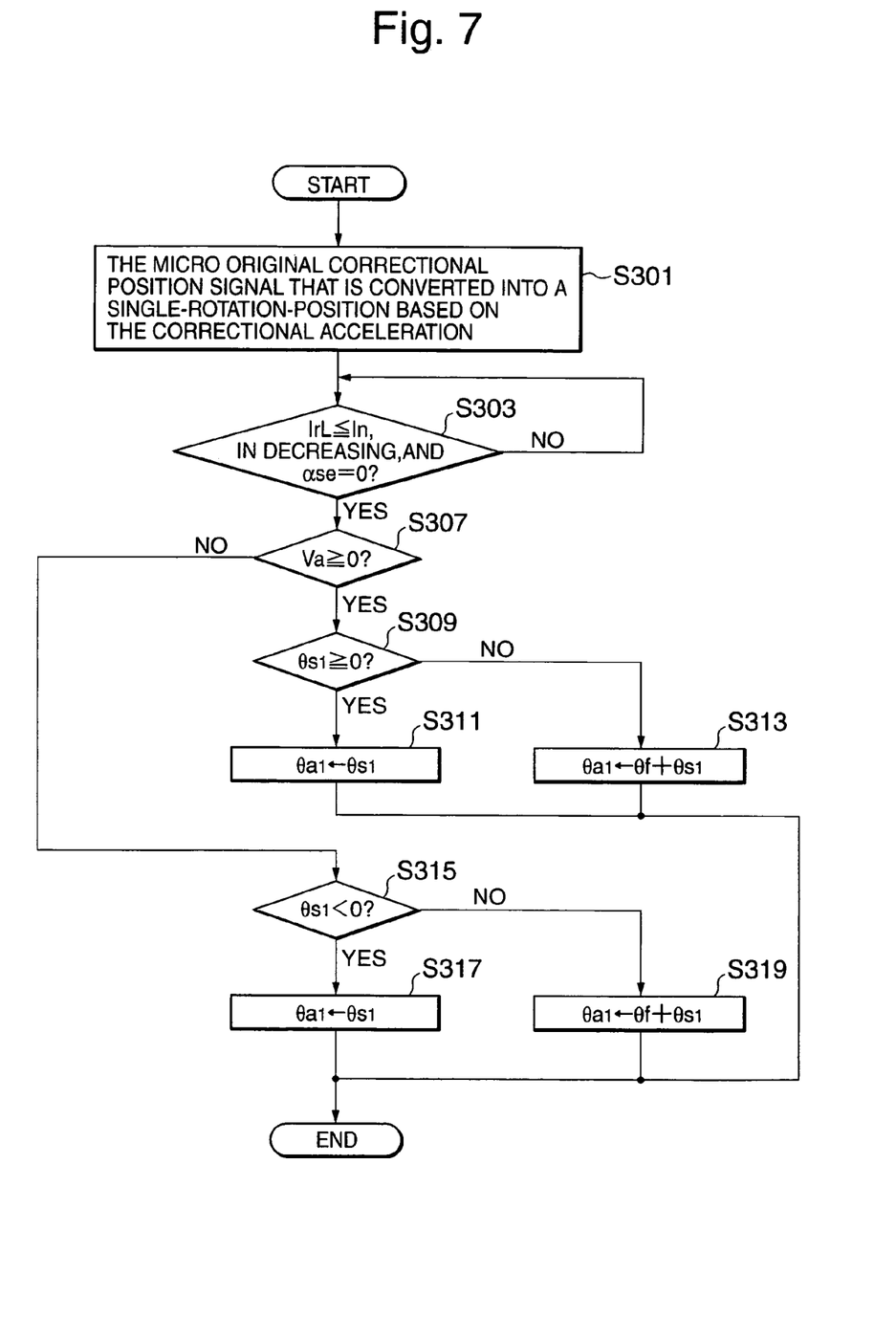
FIG. 7 is a flow chart illustrating operations of a correction unit within one rotation illustrated in the FIG. 5.

The within-single-rotation correction unit 427 calculates a micro-original correctional position signal θs1 that is converted into a single-rotation-position of the motor 18 based on the correctional acceleration signal αse and the low acceleration signal αd (step S301).

The within-single-rotation correction unit 427 judges whether a reduction current Ib flowing into the motor 18 is lower than a predetermined current In in deceleration, as described in FIG. 2. If the Ib is equal to or lower than the In, the within-single-rotation correction unit judges whether the correctional acceleration signal αse becomes zero (step S303). Here, judging whether the Ib is equal to or lower than the In is done for generating the micro-correctional position signal θa1. Moreover, it should be understood that if the correctional acceleration signal αse is not zero the micro-correctional position signal θa1 is not determined.

The within-single-rotation correction unit 427 judges whether the motor 18 is rotating forward, by determining whether the original velocity-instruction signal Va is equal to or greater than zero when the conditions of step 303 are met (step 307). If the original velocity-instruction signal Va is equal to or greater than zero, that is, if the motor 18 is rotating forward, the unit judges whether the micro-original-correctional position signal θs1 is equal to or greater than zero (step 309). If the signal θs1 is equal to or greater than zero, the subtraction unit 328 calculates a micro-deviation-position θe1 that is equal to the difference between the return-position signal θL1 obtained through the gain unit 329 and the integrating unit 331, and the micro-correctional position signal θa1. The gain unit 329 then generates the micro-correctional velocity signal VL1 (step 313).

Meanwhile, if the micro-original-correctional position signal θs1 is not equal to or greater than zero at step S309, the micro-correctional position signal θa1, in which the single-rotation-reference-position signal θf within single rotation is added to the micro-original-correctional position signal θs1, is generated.

Then, if the original velocity-instruction signal Va is not equal to or greater than zero at step S307, it is judged whether the micro-original-correctional position signal θs1 is less than zero (step 315). If the micro-original-correctional position signal θs1 is less than zero, the micro-correctional position signal θa1 that is the same as the micro-original-correctional position signal θs1 is generated (step 317). Moreover, if the micro-original-correctional position signal θs1 is not less than zero at step 315, the micro-correctional position signal θa1, in which the single-rotation-reference-position signal θf is added to the micro-original-correctional position signal θs1, is generated (step 319).

Then, the reference-velocity signal Vo is generated based on the stop-velocity-instruction signal Vr1 via the differentiating unit 103, the subtraction unit 104, and the integrating unit 105. The adding unit 333 then calculates the stop-velocity-instruction signal Voe, which is equal to the sum of the reference-velocity-instruction signal Vo and the micro-correction-velocity signal Vl1, and inputs it into the integrating unit 107. The motor 18 is controlled and driven based on the position-instruction signal θr that is generated from the integrating unit 107. The motor 18 is driven with a required current being made to flow, as described in Embodiment 1.

INDUSTRIAL APPLICABILITY

As described above, the motor control device of the invention is suitable for main axle motors of numerical control devices.

The invention claimed is:

1. A motor control device comprising:
   a encoder for detecting, as a position-detection signal, rotational position of a motor driving a control target object;
   a motor controller for controlling the motor by means of a position loop, based on position-deviation equal to the difference between a position-instruction signal instructing the rotational position of the motor, and the position-detection signal;
   an differentiator for generating an original acceleration-instruction signal for accelerating or decelerating the motor;
   a current limiter for, when a current-instruction signal to the motor reaches a predetermined value, limiting the current-instruction signal and turning a limiting signal from off to on;
   a model-position-generator having a model of an equivalent position-control system including characteristics of the motor control device, the motor, and the control target object, for calculating rotational position of the motor as a model-position signal by inputting the position-instruction signal into the model;
   a correctional acceleration-generator for generating, when the limiting signal turns on, a first correctional acceleration signal based on a correctional position deviation equal to the difference between the model-position signal and the position-detection signal; and
   a position-instruction-generator for generating the position-instruction signal based on an acceleration deviation equal to the difference between the original acceleration-instruction signal and the first correctional acceleration signal.

2. A motor control device as recited in claim 1, comprising,
   a first corrector for, when the motor is accelerating, zeroing the first correctional acceleration signal by satisfying the relation "first correctional acceleration signal αse<0," and for, when the motor is decelerating, zeroing the first correctional acceleration signal by satisfying the relation "first correctional acceleration signal αse>0."

3. A motor control device as recited in claim 1, comprising,
   a second corrector, when the motor is accelerating, wherein the first correctional acceleration signal is made lower than the original acceleration signal by letting the first correctional acceleration signal be αse and the original acceleration signal be αa and by satisfying the relation "αse≧αa," and when the motor is decelerating, the first correctional acceleration signal is made lower than the original acceleration signal by satisfying the relation "αse<αa."

4. A motor control device as recited in claim 1, comprising,
   an alarm for issuing an alarm when the correctional position deviation value reaches a predetermined value.

5. A motor control device comprising:
   a encoder for detecting, as a position-detection signal, rotational position of a motor driving a control target object;
   a motor controller for controlling the motor by means of a position loop, based on position-deviation equal to the difference between a position-instruction signal instructing the rotational position of the motor, and the position-detection signal;

an differentiator for generating an original acceleration-instruction signal for accelerating or decelerating the motor;

a current limiter for, when a current-instruction signal to the motor reaches a predetermined value, limiting the current-instruction signal and turning a limiting signal from off to on;

a model-position-generator having a model of an equivalent position-control system including characteristics of the motor control device, the motor, and the control target object, for calculating rotational position of the motor as a model-position signal by inputting the position-instruction signal into the model;

a correctional acceleration-generator for generating, when the limiting signal turns on, a first correctional acceleration signal based on a correctional position deviation equal to the difference between the model-position signal and the position-detection signal;

an acceleration controller for generating when the limiting signal turning from on to off, a second correctional acceleration signal that is lower than the first correctional acceleration signal; and a position-instruction-generator for generating the position-instruction signal based on an acceleration deviation equal to the difference between the original acceleration-instruction signal and one of the first correctional acceleration signal and the second correctional acceleration signal.

6. A motor control device as recited in claim 5, wherein the acceleration controller comprises;

a velocity-instruction generator for generating an original velocity-instruction signal for rotating the motor;

a integrator for generating a reference-velocity-instruction signal based on the acceleration deviation;

a subtracter for calculating a reference-velocity deviation equal to the difference between the original velocity-instruction signal and the reference-velocity-instruction signal; and a divider for generating the second correctional acceleration signal based on the reference-velocity deviation.

7. A motor control device as recited in claim 5, comprising, a first corrector for, when the motor is accelerating, zeroing the first correctional acceleration signal by satisfying the relation "first correctional acceleration signal $\alpha se<0$," and for, when the motor is decelerating, zeroing the first correctional acceleration signal by satisfying the relation "first correctional acceleration signal $\alpha se>0$."

8. A motor control device as recited in claim 5, comprising, a second corrector, when the motor is accelerating, wherein the first correctional acceleration signal is made lower than the original acceleration signal by letting the first correctional acceleration signal be $\alpha se$ and the original acceleration signal be $\alpha a$ and by satisfying the relation "$\alpha se \geq \alpha a$," and when the motor is decelerating, the first correctional acceleration signal is made lower than the original acceleration signal by satisfying the relation "$\alpha se < \alpha a$."

9. A motor control device as recited in claim 5, comprising:

a velocity-instruction generator for generating an original velocity-instruction signal for rotating the motor;

a correctional position-integrator for calculating, based on the first and second correctional acceleration signal, a cumulative position-correcting signal that is a cumulative value of a position-correction value and that drives the motor, and for generating the cumulative position-correcting signal by the original velocity-instruction signal turning off.

10. A motor control device as recited in claim 5, comprising:

a velocity-instruction generator for generating an original velocity-instruction signal for rotating the motor;

a within-single rotation instructor for generating a stop-position-instruction signal that stops the motor at a predetermined stop-position when the original velocity-instruction signal turns off;

a integrator for calculating a correctional position signal for the motor based on the first and second correctional acceleration signal; and an within-single rotation corrector for calculating a correctional position signal that is a sum of the stop-position-instruction signal and the correctional position signal and that drives and stops the motor at the predetermined position.

11. A motor control device as recited in claim 5, comprising, an alarm for issuing an alarm when the correctional position deviation value reaches a predetermined value.

* * * * *